Oct. 31, 1939.  H. C. JOHNSON  2,177,939
JUICE EXTRACTING DEVICE
Filed Jan. 17, 1938
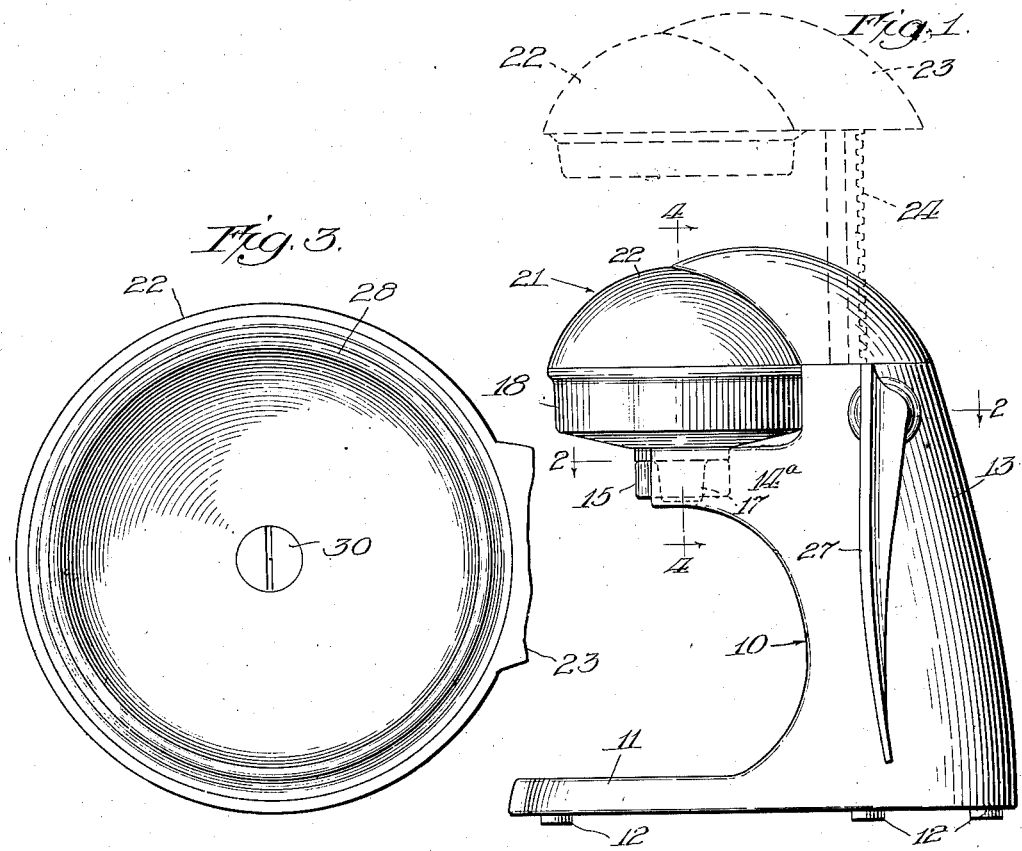
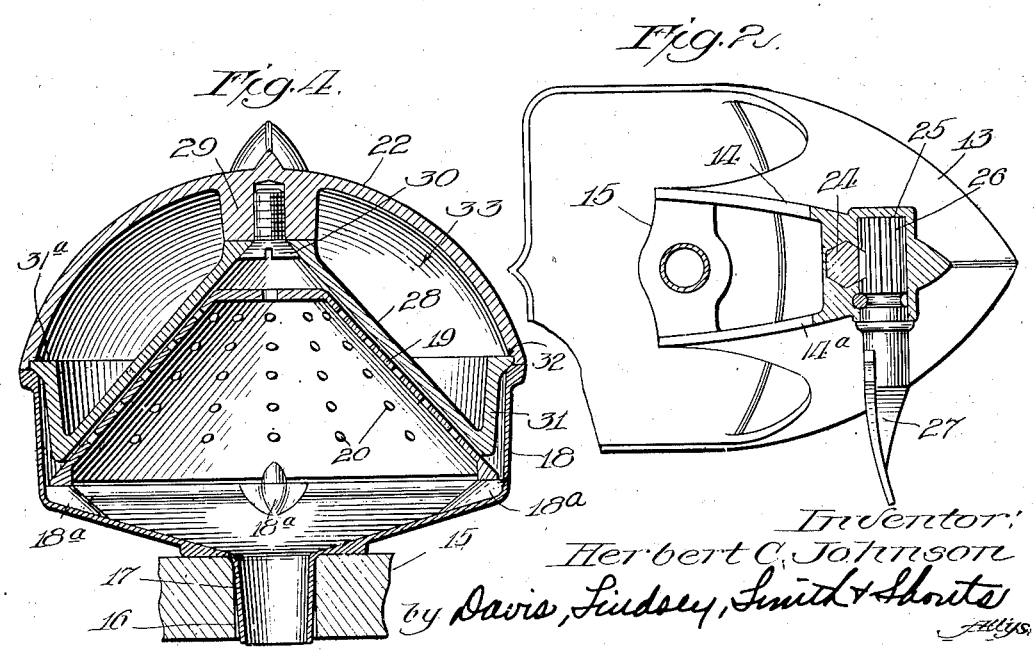
Inventor:
Herbert C. Johnson
by Davis, Lindsey, Smith & Shonts
Attys.

Patented Oct. 31, 1939

2,177,939

UNITED STATES PATENT OFFICE 2,177,939

JUICE EXTRACTING DEVICE

Herbert C. Johnson, Wilmette, Ill.

Application January 17, 1938, Serial No. 185,268

4 Claims. (Cl. 100—42)

My invention relates to juice extracting devices and it has to do more particularly with a manually operable device of this character which is of a portable nature and which is well suited for domestic or other use in extracting juices from fruits, such as oranges, lemons, etc.

One of the objects of my invention is to provide an improved device of the foregoing character which is simple in construction, is inexpensive to manufacture, is compact and durable, and is adapted for rapidly extracting substantially all the juice from the fruit.

Another object is to provide a sanitary juice extracting device that may readily be cleaned and which having been cleaned after a juice extracting operation is kept in a clean and sanitary condition until the next juice extracting operation is performed.

A more specific object is to provide a device of the foregoing character which includes mating squeeze members carried, respectively, by cup members so constructed that their open edge portions may be moved in contact with each other to enclose and conceal the squeeze members, the arrangement of the squeeze and cup members being such that when the cup members are moved together in a juice extracting operation all of the juice extracted is positively directed into one of the cup members from which the juice is discharged for use.

Other objects and advantages will become apparent as this description progresses and by reference to the drawing wherein, Figure 1 is a side elevational view of one form of juice extracting device embodying my invention, the parts being shown in full lines in its so-called closed position and in dotted lines in its so-called open position;

Fig. 2 is a horizontal section taken substantially on line 2—2 of Fig. 1;

Fig. 3 is an enlarged fragmental bottom plan view of the upper or movable squeeze member unit shown in Fig. 1; and Fig. 4 is an enlarged section taken substantially on line 4—4 of Fig. 1.

The device shown in the drawing includes a body 10 having a rather broad base portion 11, the under side of which is provided with rubber or other non-marring, supporting feet 12. The body 10 is further provided, at the rear end of the base portion 11, with an upstanding part 13 having at its opposite sides and near its upper end a pair of integral, spaced, forwardly-extending arms 14, 14a joined together at their forward ends by an integral crosspiece 15. The crosspiece 15 is of substantial thickness and it is provided with a centrally located opening 16 in which is received the bottom spout 17 of an upright squeezer-supporting and juice-receiving cup 18. The upper side of the cross support 15 adjacent the opening 16 is flat and is disposed in a horizontal plane, and the bottom of the cup member 18 around the spout 17 is likewise flattened for engaging the horizontal surface of the cross support 15 around the opening 16 for holding the cup 18 in a horizontal position and against tipping. The remainder of the bottom of the cup 18 slopes downwardly toward the spout 17 for a purpose which will become obvious. The cup 18 supports a removable frusto-conical squeeze member 19 which is provided with a plurality of openings 20 to permit the ready passage of juice. The bottom edge or base portion of the squeeze member 19 is of slightly less diameter than the inside diameter of the cup 18; and such squeeze member is supported in raised position away from the bottom of the cup by a plurality of similar, annularly-spaced flat-top bosses or seat elements 18a formed integrally with the bottom of the cup 18, for the purpose of permitting the ready passage of juice past the edge of the squeeze member 19 into the bottom of the cup.

An upper or movable squeeze unit 21 cooperates with the cup 18 and squeeze member 19 for the extraction of juice. This squeeze unit 21 includes an inverted circular cup member 22 having an integral arm 23 which is fixedly secured to the upper end of a rack 24 reciprocably mounted in an opening in the upstanding body portion 13. The body portion 13, at its upper end, is provided with a lateral opening 25 in which is rotatably confined a pinion 26 engaging the teeth of the reciprocable rack 24. A handle 27 is connected to one end of the pinion 26 and by rotating the handle the rack bar 24 is reciprocated and the squeeze unit 21 is moved toward and from the stationary cup 18 and squeeze member 19.

The cup member 22 rigidly supports a detachable, frusto-conical squeeze member 28. To this end, the inner bottom wall of the cup 22 is provided with a depending circular and central boss 29 to which the upper end or frustum of the squeeze member 28 is secured by a screw 30. The upper end of the squeeze member 28 is flattened and disposed in a horizontal plane to engage a complemental surface at the lower end of the boss 29, and this tends to prevent tipping of the squeeze member 28 when the squeeze members are brought together in a juice extracting operation. However, when the squeeze members are brought together with the fruit therebetween for juice extracting purposes, rather severe strains and stresses are imposed on the squeeze members and an unequal distribution of the same may tend to cause early breakage of the connection between the squeeze member 28 and the boss 29 unless otherwise guarded against. To this end, the lower edge portion of the squeeze member 28, which projects a substantial distance below the open end portion of the cup member 22, is provided with an exterior and integral, upstanding annular flange 31 which serves, in part, as an additional support for the squeeze member. To this end, the lower edge of the open end portion of the cup 22 is provided with an inner annular shoulder 32 against which the upper flared edge 31a of the squeeze member flange 31 seats. In this way, the lower edge of the squeeze member 28 is rigidly supported against tipping movement in any direction by the lower or open end of the cup member 22, thereby relieving the connection 30 of abnormal strains and stresses that would, in time, loosen or break the same.

The squeeze member 28 is of such size and shape that its side wall is spaced from the wall of cup member 22 forming a space 33 into which, unless closed, juices would tend to find their way and this, if it should occur, would produce an insanitary condition because of the difficulty in cleaning such space. The foregoing objectionable condition is guarded against by the flange 31 which seals off the space 33 between the cup 22 and squeeze member 28 so that all juices, when extracted, are positively directed into the bottom cup 18.

It is believed that the operation and advantages of my invention will be readily apparent from the foregoing. When it is desired to extract the juice from a fruit, such as an orange, lemon, or the like, the fruit is cut so as to expose its juice-bearing surface and this surface is placed upon the lower squeeze member 19. The handle 27 is then actuated to lower the upper squeeze unit 21 and, as this action takes place, the squeeze members 28 and 19 cooperate to extract the juice. The bottom squeeze member is received within the squeeze member 28, the latter projecting below the cup member 22 a sufficient distance to permit movement of the squeeze member into the cup 18 for complete cooperation of the squeeze members to extract the juice. The juice extracted finds its way through and around the squeeze member 19 and flows downwardly through the spout 17 into a receptacle (not shown) that may be placed therebeneath upon the base portion 11. It is customary, after extracting the juice, to clean the device by washing, or the like, and this may readily be accomplished by removing the lower cup 18 and the squeeze member contained therein. The upper squeeze member may readily be cleaned without detachment in view of the nature of its mounting as above set forth. When the device has been cleaned, the upper squeeze unit is preferably moved into the so-called closed position shown in Fig. 1 so that both of the squeeze members are covered and concealed so that dirt, dust, etc., will not find their way thereupon and the device will remain in a sanitary condition until it is again desired to use the same. The foregoing structure is not only compact so that it may be readily stored when not in use, but it is quite simple and sturdy in construction. It may be readily manufactured by suitable die casting operations so that it is of an inexpensive character, while being highly efficient as a juice extracting device.

It will be understood that while I have shown and described only one form of structure embodying my invention, changes in details and arrangement of parts may be resorted to without departing from the spirit and scope of my invention as defined by the claims that follow.

I claim:

1. A juice extracting device comprising a body member, a stationary upright cup member carried by said body member, a conical squeeze member having its base part seated removably upon the bottom of said cup member with its top part extending above the cup member, a squeeze unit carried by said body member and movable toward and from said cup member, said unit including an inverted cup member having an open end portion adapted to seat upon the open end portion of said upright cup member, a second squeeze member shaped similarly to said first squeeze member and having its top part secured centrally to the inner wall of said inverted cup member with its side wall spaced from said inverted cup member and its base part projecting below the open end portion of said inverted cup member in spaced relation thereto, means extending from the base part of said second squeeze member to the open edge portion of said inverted cup member for closing the space between such members, and means for supporting said unit upon said body member for movement of said movable cup member and squeeze member toward and from said stationary cup member.

2. A juice extracting device comprising a body member, an upright stationary cup member carried by said body member, a frusto-conical squeeze member having its base part seated in said upright cup member with its frustum projecting upwardly thereabove, a squeeze unit carried by said body member and movable toward and from said upright cup member, said unit including an inverted cup member having its open end portion shaped and sized to fit upon the open end portion of said upright cup member, a frusto-conical squeeze member having its frustum detachably secured centrally to the inner bottom portion of said inverted cup member and having its side wall projecting downwardly in spaced relation along and below the adjacent surface of said inverted cup member, an annular flange projecting exteriorly from the base portion of said second squeeze member to the open edge portion of said inverted cup member for sealing the space between such members to prevent extracted juices and other objects from finding their way therebetween, and for additionally supporting and bracing said second squeeze member against squeeze strains and stresses, and means for supporting said unit upon said body member for movement of said unit toward and from said upright cup member.

3. A juice extracting device comprising a body member, an upright stationary cup member carried by said body member, a frusto-conical squeeze member having its base part loosely seated in said upright cup member with its frustum projecting upwardly thereabove, a squeeze unit carried by said body member and movable toward and from said upright cup member, said unit including an inverted cup member having its open end portion shaped and sized to fit upon the open end portion of said upright cup member, a frusto-conical squeeze member having its frustum detachably secured centrally to the inner bottom portion of said inverted cup member and having its side wall projecting downwardly in spaced relation along and below the adjacent surface of said inverted cup member, so that the base part of said second squeeze member extends below the open end portion of said inverted cup member, an annular flange member integral with and projecting exteriorly and upwardly from the base part of said second squeeze member, the open end portion of said inverted cup member having a recess and the upper edge of said flange being shaped to fit into said recess, the arrangement being such that the upper edge of said flange also seats upon the open end portion of said upright cup member when the open end portions of said cup members are brought into engagement; and means for supporting said unit upon said body member for movement toward and from said upright cup member.

4. In a juice extracting device of the character described, a squeeze unit comprising an inverted cup member having a closed bottom wall, an attachment arm on said cup member, a frusto-conical squeeze member having its frustum detachably secured to the inner part of said bottom wall with its axis coinciding substantially with the axis of said cup member, said squeeze member being of greater height and of lesser diameter than said cup member so that its side wall is disposed in spaced relation to said cup member with its base part projecting below the open end of said cup member, and an annular exterior flange formed integrally with the base portion of said squeeze member and extending exteriorly and upwardly away from the base portion of said squeeze member in a direction substantially parallel with the axis of said squeeze member, said flange being of such width and said cup member being so shaped and sized that said flange engages the open end portion of said cup member for support of said squeeze member and for sealing the space between said squeeze member and said cup member.

HERBERT C. JOHNSON.